United States Patent [19]

Lefebvre et al.

[11] Patent Number: 5,718,258

[45] Date of Patent: Feb. 17, 1998

[54] RELEASING ADDITIVES INTO ENGINE OIL

[75] Inventors: Byron Lefebvre; Richard J. Ford, both of Boynton Beach, Fla.

[73] Assignee: T/F Purifiner, Inc., Boynton Beach, Fla.

[21] Appl. No.: 740,139

[22] Filed: Oct. 22, 1996

[51] Int. Cl.⁶ ................................................ B01F 1/00
[52] U.S. Cl. ........................... 137/268; 422/261; 422/277
[58] Field of Search ............................ 137/268; 422/261, 422/264, 277, 275

[56] References Cited

U.S. PATENT DOCUMENTS

| | | | |
|---|---|---|---|
| 2,955,028 | 10/1960 | Bevans | 137/268 |
| 4,014,794 | 3/1977 | Lewis | 210/206 X |
| 4,066,559 | 1/1978 | Rohde | 252/10 |
| 4,144,166 | 3/1979 | DeJovine | 210/60 |
| 4,402,912 | 9/1983 | Krueger et al. | 137/268 X |
| 5,459,074 | 10/1995 | Muoni | 422/261 X |
| 5,591,330 | 1/1997 | Lefebvre | 210/203 |
| 5,643,541 | 7/1997 | Peddicord et al. | 422/261 X |

FOREIGN PATENT DOCUMENTS

WO 95/32045  11/1995  WIPO.

*Primary Examiner*—Kevin Lee
*Attorney, Agent, or Firm*—Nixon & Vanderhye P.C.

[57] ABSTRACT

A canister for releasing oil additives into oil in an internal combustion engine, hydraulic equipment, or automatic transmission includes a container having an inlet, outlet, and interior volume. Partitions divide the interior volume into a plurality of different individual compartments, and a plurality of discrete shapes of thermoplastic material with oil property improving additives are disposed within at least a plurality of the individual compartments. The partitions may comprise a metal grid, the container may be disc-shaped with perforated end walls, and the container desirably fits between the engine block and a conventional oil filter. Alternatively the container may comprise an elongated tube having first and second end faces with the partition comprising disc-shaped elements extending in a plane substantially transverse to the dimension of elongation of the container. The inlet may have a metering tube, and the outlet a screen, and the container is connected between the engine block and an oil filter.

20 Claims, 4 Drawing Sheets

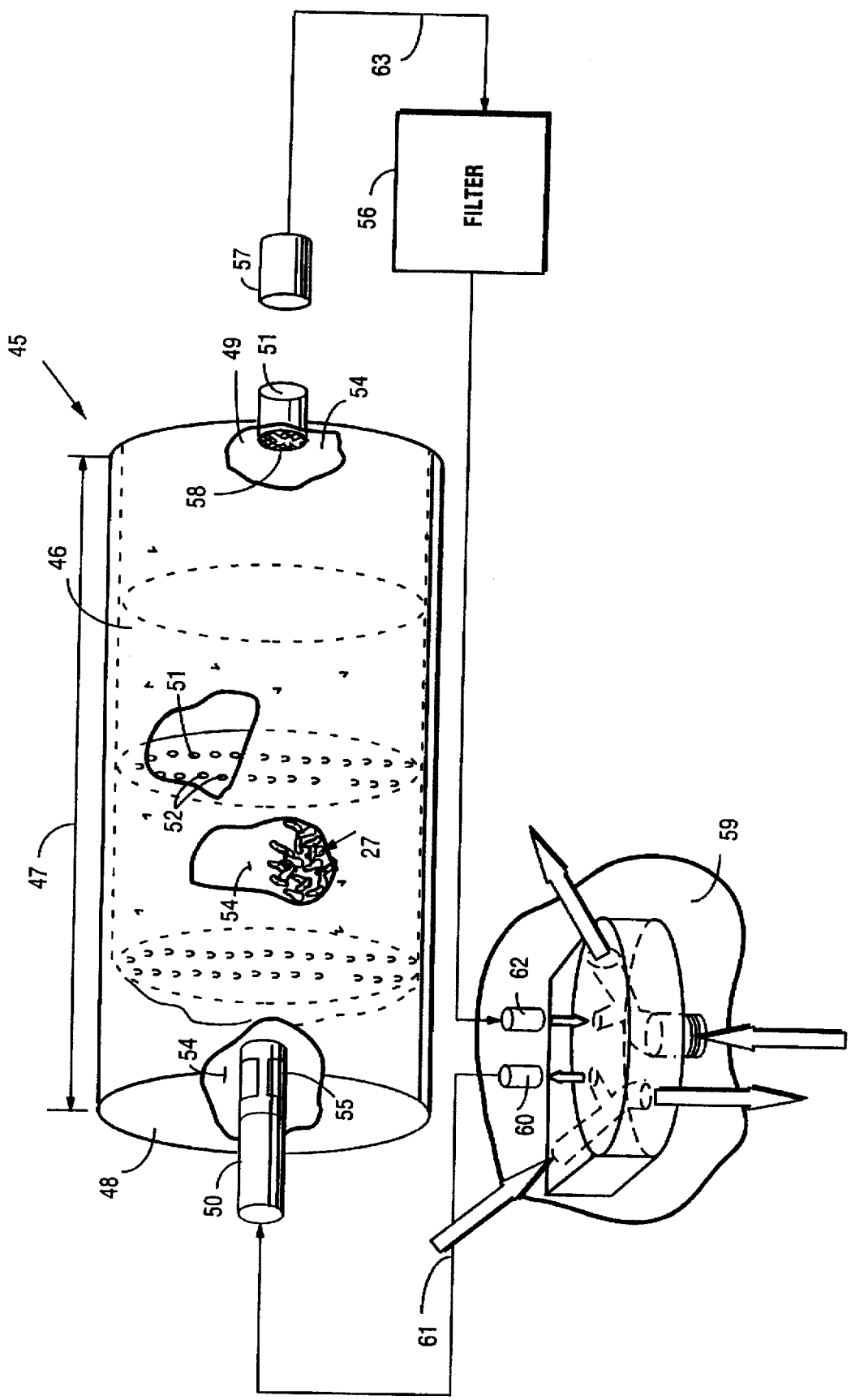

RELEASING ADDITIVES INTO ENGINE OIL

BACKGROUND AND SUMMARY OF THE INVENTION

During the filtering of oil in working engines, particularly lubricated internal combustion engines such as in motor vehicles, [and in hydraulic equipment and automatic transmissions] oxidation and sulfur acidification of the oil commonly occur either requiring more frequent oil and oil filter changes, or adversely affecting engine operation over time. For that reason, it is known to utilize thermoplastic polymers having additives—such as anti-oxidants—incorporated therein in order to extend the time between oil filter changes and/or adequately protect the invention. Examples of these techniques are shown in U.S. Pat. Nos. 4,066,559 and 4,144,166, the disclosures of which are hereby incorporated by reference herein.

In co-pending application Ser. No. 08/249,272 filed May 24, 1994 (the disclosure of which has been incorporated by reference herein) a plurality of discrete shapes of thermoplastic material are provided. The thermoplastic material gradually dissolves in above ambient temperature oil (e.g. about 150° F. or higher), the thermoplastic having oil property improving additives which are released into the oil over time as the thermoplastic material dissolves. The discrete shapes (e.g. the shape of pellets, such as rice-shaped pellets or strands) optimizes the ability of an oil filter to neutralize sulfur acidification and oxidation, or to release other additives into the oil. While the discrete shapes provides in said co-pending application are highly desirable, in said co-pending application they are provided integrally with an oil filter. Sometimes, however, it is desirable to provide the additive release material distinct from the oil filter itself, allowing the additive release material to be replaced at different times than the filters, or allowing the use of additive release materials with all types of conventional filters.

According to one aspect of the present invention a canister for releasing oil additives into oil in an internal combustion engine, hydraulic equipment, or automatic transmissions, is provided. The canister comprises the following components: A container having an inlet, an outlet, and an interior volume between the inlet and outlet. Partitions dividing the interior volume into a plurality of different individual compartments. A plurality of discrete shapes of thermoplastic material which gradually dissolves in above ambient temperature oil, the thermoplastic material having oil properties improving additives which are released into the oil over time as the thermoplastic material dissolves. And, the discrete shapes disposed within at least a plurality of the different individual compartments.

According to one aspect of the present invention the partitions may comprise a metal grid (e.g. 16 gauge steel) and the discrete shapes are disposed in substantially all of the individual compartments. In this embodiment a container may have first and second perforated end faces which contain the inlet and outlet respectively, and the container may be substantially disc-shaped, having a circumferential wall that is approximately ⅛ to ½ inch long, and so that the entire thickness of the container is about ⅛–½ inch (e.g. about ¼ inch). The first end face may have a flexible material seal surrounding the inlet which can seal with the oil block of an internal combustion engine.

The container may further comprise a central opening larger than the perforation openings in each end wall in alignment with each other, and there is further provided an interior wall extending between the central openings to provide a central oil flow passage distinct from the oil flow through the perforation openings. An O-ring may be provided surrounding each of the central openings to seal the container to the engine block and an oil filter. The container may be provided in combination with an oil filter and engine block, the container disposed between the oil filter and engine block and the engine block having an exteriorly threaded tube which extends through the central openings and engages the oil filter.

Typically the perforation openings overlap a plurality of individual volumes, and the openings are dimensioned and positioned with respect to the grid and the discrete elements are shaped and dimensioned so that the discrete elements cannot pass through the perforation openings. The container may comprise first and second parts, each having a perforated end wall and a circumferential wall, the first part circumferential wall having a larger diameter than the second part circumferential wall so that the circumferential walls are concentric, and a sealant (such as a flexible Plastasol type sealant) may seal the parts together. The discrete shape additives may include an anti-oxidant, acid neutralizer, anti-foaming agent, detergent, viscosity enhancer, or combinations thereof.

In an alternative embodiment the container may comprise an elongated tube having first and second end faces, and a circumferential wall having a length of more than one inch (typically several inches) in the dimension of elongation of the tube, the inlet in the first face and the outlet in the second face. The partitions may comprise disc-shaped elements each extending in a plane substantially transverse to the dimension of elongation, the elements having a plurality of openings therein shaped and dimensioned with respect to the discrete shapes so that the discrete shapes cannot pass through the openings in the elements.

Typically the individual volumes are less than filled with the discrete shapes (e.g. about 40–80% filled) so that oil flowing through the container will agitate and flow around the discrete shapes for optimum additive release. Also there preferably is a check valve connected to the outlet to preclude reverse flow of oil into the outlet. The inlet typically includes a metering jet for limiting the flow rate through the container while a screen is disposed at the outlet. The individual compartments typically include an end compartment adjacent the second face, the end compartment preferably being devoid of the discrete shapes. The inlet is typically connected to an engine block and the outlet is connected to an oil filter.

It is the primary object of the present invention to provide desirable oil additive release materials distinct from an oil filter. This and other objects of the invention will become clear from an inspection of the detailed description of the invention, and from the appended claims.

BRIEF DESCRIPTION OF THE DRAWINGS

FIG. 5 is a perspective view, with portions of the casing cut away for clarity of illustration, of a second embodiment of a container according to the present invention shown schematically in association with an engine block and oil filter.

DETAILED DESCRIPTION OF THE DRAWINGS

Figure 1:
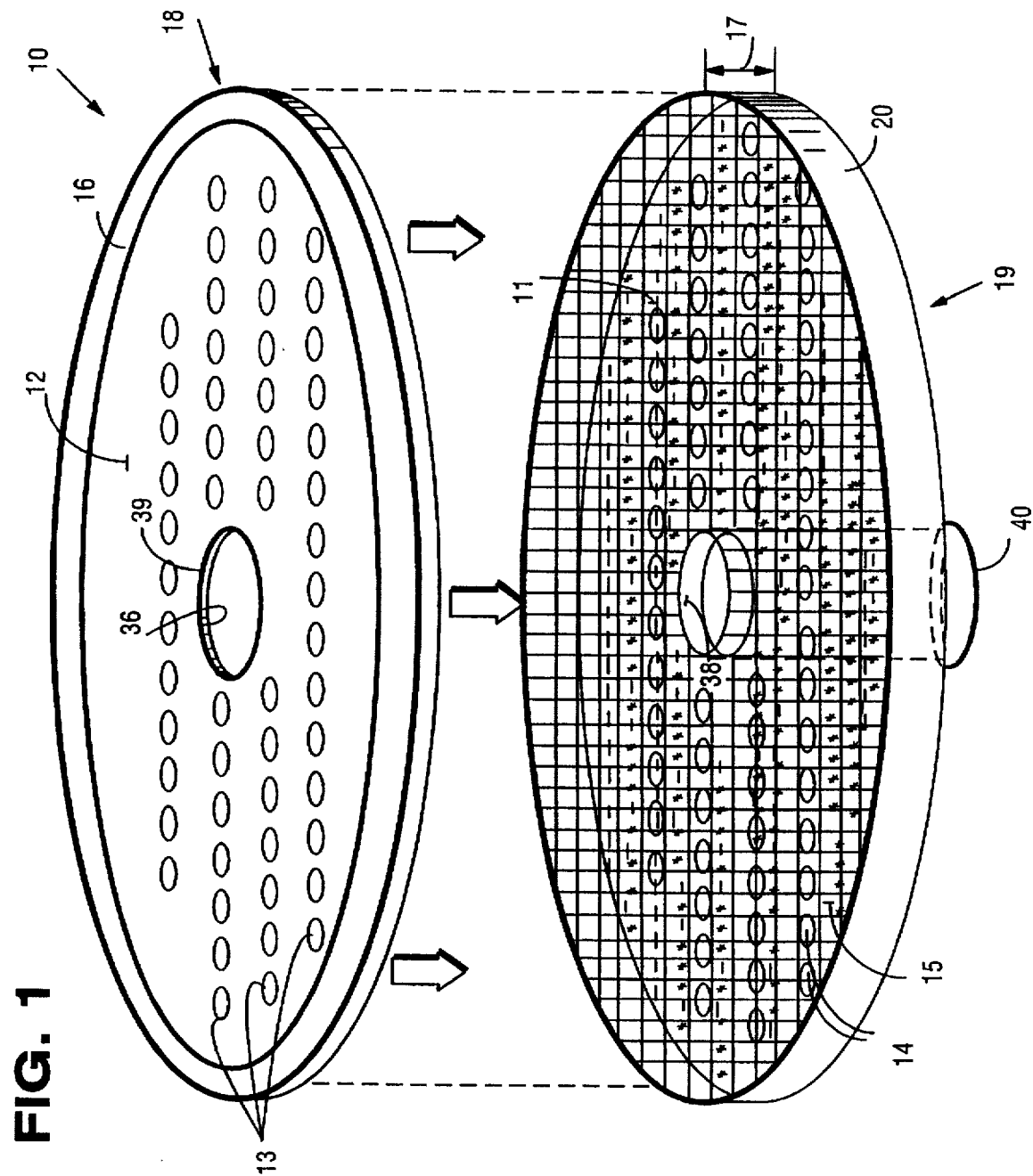
FIG. 1 is a perspective exploded view of one exemplary embodiment of a canister for releasing oil additives into oil.

FIGS. 1 through 4 illustrate one exemplary embodiment of a canister for releasing oil additives into oil in an internal combustion engine, hydraulic equipment, automatic transmissions, or the like, according to the present invention. In the embodiment of FIGS. 1 through 4 the canister is shown generally by reference numeral 10 and includes an inlet, outlet, and an interior volume, the interior volume shown generally by reference numeral 11 in FIG. 1. The container has a generally disc shape with a total thickness of approximately ⅛ to ½ inch (e.g. about ¼ inch). The inlet comprises a first end face 12 with a plurality of perforation openings 13 therein. The outlet includes perforation openings 14 in the second end face 15. The container 10 also has a circumferential wall 16 with a total thickness 17 (e.g. approximately ⅛ to ½ inch) so that the container 10 may fit appropriately in association with a conventional oil filter on an engine block.

In the embodiment illustrated in FIG. 1 the container 10 is formed in two parts shown generally by reference numerals 18 and 19. The first part 18 circumferential wall 16 has a slightly larger diameter than the second part circumferential wall 20 so that the part 18 overlaps the part 19. Then the entire periphery of the circumferential wall 16 may be sealed to the circumferential wall 20 with any suitable sealing component, such as a flexible Plastisol type sealant, shown generally by reference numeral 21 in FIG. 4.

The embodiment shown in FIGS. 1 through 10 also includes a partition dividing the interior volume 11 into a plurality of different individual compartments. Preferably the partition takes the form of a metal grid, shown schematically and in general by reference numeral 23 in FIG. 2. For example the grid 23 may be constructed of 16 gauge steel, and the individual compartments 24 are rectangular or square in configuration. The grid has approximately the same height 25 as the height of the circumferential wall 20, and prevents the ends 12, 15 from collapsing, providing rigidity to the entire container 10.

Figure 3:
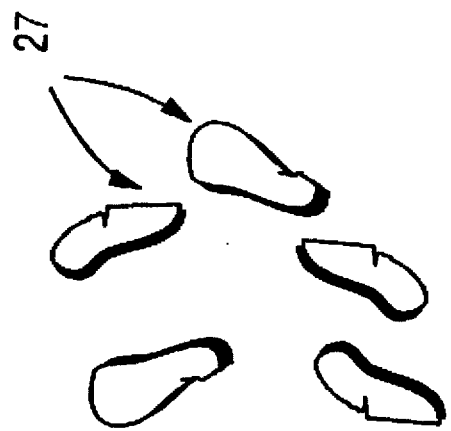
FIG. 3 is an enlarged perspective view of one exemplary geometric configuration that the thermoplastic material discrete shapes according to the invention may take.
Figure 2:
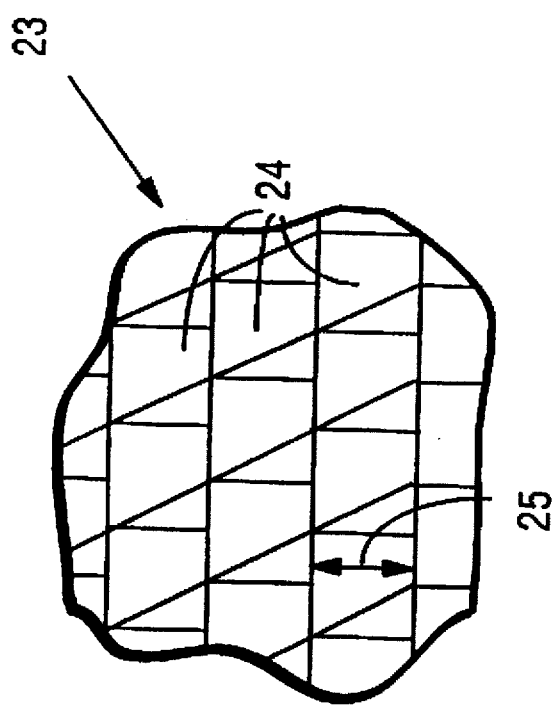
FIG. 2 is a detail perspective view of a metal grid that may be used in the construction of FIG. 1.

The container 10 also includes a plurality of discrete shapes, such as the pellets shown generally by reference numeral 27 in FIG. 3, disposed within the individual compartments 24, a plurality of the discrete shapes 27 disposed within substantially each of the compartments 24 in the preferred embodiment. The discrete shapes may include a variety of different configurations, such as strands, cubes, spheres, or—as illustrated in FIG. 3—rice-shaped pellets (disclosed and described in detail in said co-pending application). While a wide variety of different materials may be provided, the thermoplastic material discrete shapes 27 may comprise about 83–90% [all percentages indicated herein are weight %] liquid ethylene propylene, and about 10–17% dispersing agent, lubricant, and detergent neutralizer combined. For example, additives provided in the polypropylene may comprise about 3–5% dispersing agent, about 1–1.5% organic phosphate lubricant, about 2.5–3.5% detergent neutralizing sulfonate, and about 4.5–5.5% detergent neutralizing phenate. In one particular embodiment according to the invention, ethylene propylene in liquid form may comprise 86.8 parts, Cooper E-644 dispersing agent 4.0 parts, Cooper E-685 zinc organic phosphate lubricant 1.2 parts, Cooper E-654 detergent neutralizing sulfonate 3.0 parts, and Cooper M-6148 detergent neutralizing phenate 5.0 parts. In the manufacture of the pellets 27, the anti-oxidation and acidification additives are mixed with the liquid thermoplastic material to form a thermoplastic mixture. Then the mixture is extruded, utilizing a conventional extruder, into spaghetti-like strands having a thickness of about 0.0625–0.125 inches. Then the strands are cooled, as in a cooling trough, and cut, as by using a conventional chopper, into discrete elements 27. That is the discrete shapes additives may include an anti-oxidant, acid neutralizer, anti-foaming agent, detergent, viscosity enhancer, or combinations thereof.

Figure 4:
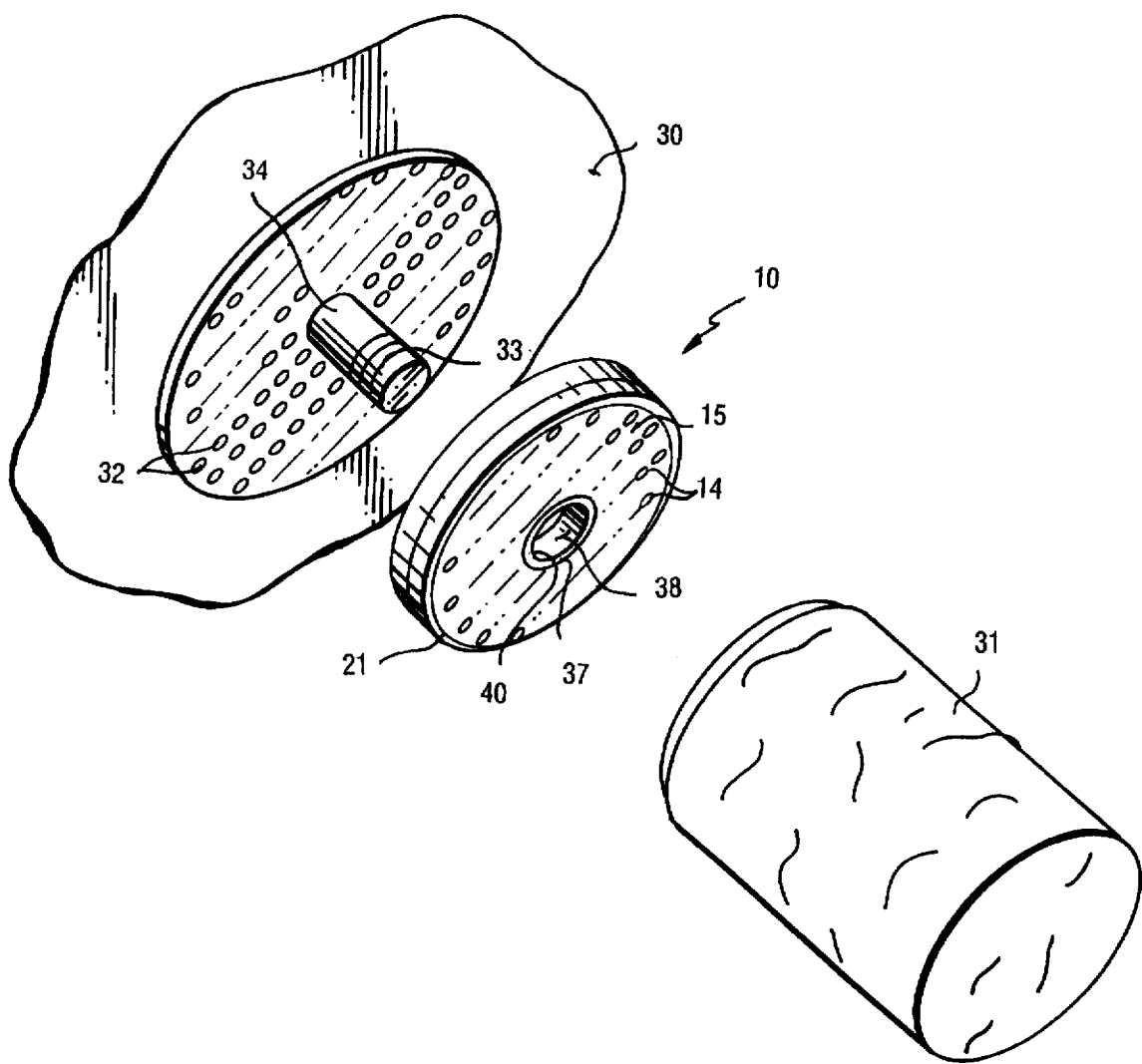
FIG. 4 is a perspective exploded view showing the container of FIG. 1 in association with an engine block and a conventional oil filter.

In addition to providing individual compartments 24 for receipt of the shapes 27, the grid 23 also provides support for the canister end faces 12, 15 to give rigidity to the entire container 10. In the preferred use of the container 10 according to the invention, as illustrated in FIG. 4, it is disposed between the engine block 30 and a conventional oil filter 31, the perforation openings 13 communicating with cooperating openings 32 or the like in the engine block. The engine block, as is conventional, has an exteriorly threaded (see 33) tube 34 extending outwardly therefrom, threads 33 being received by internal threads at the end of the oil filter 31. In order to accommodate the tube 34 the container 10 includes a central opening 36, 37, respectively, in each of the end faces 12, 15 which is larger than the perforation openings 13 and are in alignment with each other, and an interior tubular wall 38 extending between the central openings 36, 37 to provide a central oil flow passage distinct from the oil flow through the perforation openings 13, 14. Preferably an O-ring, such as the O-ring 39, 40 (typically of nitril rubber having a diameter of the rubber material itself of about ⅛ inch), or a like sealing component, is provided to seal the central passage defined by the tubular wall 38.

The perforation openings 13, 14 are positioned with respect to the partition 23 walls 24, and are dimensioned with respect the partition 23 and the discrete shapes 27 so that the discrete shapes 27 cannot pass through the perforation openings 13, 14. With the container 10 disposed between the engine block 30 and the oil filter 31, in addition to conventional filtering being provided the appropriate additives from the shapes 27 are released into the oil typically when the temperature thereof reaches a 150° F. or above and the thermoplastic material providing the bulk of the shapes 27 gradually dissolves. The container 10 is periodically replaced based upon TBN levels in a periodic oil analysis report, and typically is replaced less frequently than the filter 31.

A second exemplary embodiment according to the present invention is illustrated schematically by reference numeral 45 in FIG. 5 in which the configuration of the container, partitions, inlet, and outlet are significantly different than the embodiment of FIGS. 1 and 4.

In the embodiment of FIG. 5 the container 45 comprises an elongated tubular casing 46, which has a length 47 in the dimension of elongation thereof which is greater than an inch, and preferably several inches. The container 45 also has first and second end walls 48, 49 which have an inlet 50 and an outlet 51, respectively, therein. In this embodiment the partitions comprise a plurality of disc-shaped elements 51 each extending in a plane substantially traverse to the dimension of elongation 47 of the container circumferential wall 46, and generally parallel to each other. Each of the elements 51 has a plurality of openings 52 therein shaped and dimensioned with respect to the discrete shapes 27 so that the discrete shapes 27 cannot pass through the openings 52. Preferably the individual volumes 54 between the disc-shaped elements 51 and the end faces 48, 49, respectively, are less than completely filled with the discrete shapes 27 (e.g. typically only about 40–80% filled). The plurality of shapes 27 are provided in sufficient volume within the compartments 54 so that oil flowing through the container 45 will agitate and flow around the discrete shapes 27 for optimum additive release.

The oil is introduced in container 45 inlet 50 through a metering jet 55 which reduces the flow rate of the oil. Initially when the container 45 is connected up to a clean conventional oil filter 56 there is very little differential pressure across the filter 56 therefore the metering jet 55 [which has an opening perhaps 1/32 to 1/64 inch in dimension] restricts the flow through the filter 56 at the normal rate through the oil filter 56. As the oil gets increasingly dirty and oxidation particles and acid increase, the oil filter 56 traps many solids and the differential pressure starts to increase across the inlet and outlet sides of container 45 due to the increased resistance of flow caused by the build-up of contaminants. The increase in differential pressure causes the flow rate to increase through the container 45 allowing more of the hot oil to pass through the canister 45 thus increasing the additives in the container 47 shapes 27. This increase compensates for the additive depletion occurring in the oil as the additives normally present in the oil are consumed.

Preferably a check valve 57 is disposed in the outlet 51 (the check valve 57 of any conventional construction such as a spring pressed ball) to prevent any backflow of oil into the container 45. By releasing additives into the oil the container 45 keeps the additives in the oil at or near the new oil additive level.

In the preferred embodiment the last of the compartments 54, containing the outlet 51, preferably is left devoid of shapes 27 so that they cannot clog the opening 51. Also a screen 58 is preferably provided at the outlet 51 in the last compartment 54.

Any suitable connection may be provided between the container 45 and the filter 56 on the engine block 59. For example the outlet 60 from the engine block 59 is connected to the inlet 50 via any suitable conventional fitting 61, for example a 3/16 inch interior diameter fitting, such as a conventional swivel flared fitting to make it easy to service the additive canister 45. The inlet 62 back to the engine block 59 is connected to the filter 56 and the outlet 51 and/or check valve 57 by similar pipes and fittings illustrated schematically by 63 in FIG. 5.

The container 45 may be constructed so that it is disposable, that is once the additive value of the shapes 27 therein have been exhausted the container 45 is replaced, or the container 45 may be constructed so that it is refillable. If refillable the container 45 may be constructed so that one or both of the end faces 48, 49 are connected to a rack, which is similarly connected to the disc-shaped elements 51 so that end faces 48, and/or 49 and the elements 51 are removable from the circumferential housing 46 and the old, spent, shapes 27 may be discharged and new shapes 27 put in their place.

It will thus be seen that according to the present invention a canister for releasing oil additives into oil is provided which provides a plurality of individual compartments containing discrete shapes which the oil flows around and gradually dissolves to release the appropriate additives into the oil. While the invention has been herein shown and described in what is presently conceived to be the most practical and preferred embodiment thereof it will be apparent to those of ordinary skill in the art that many modifications may be made thereof within the scope of the invention, including the exact manner in which the individual compartments are formed, therefore the claims are to be interpreted to encompass all equivalent structures and devices.

What is claimed is:

1. A canister for releasing oil additives into oil in an internal combustion engine, hydraulic equipment, or automatic transmission, comprising:

a container having an inlet, an outlet, and an interior volume between said inlet and outlet;

partitions dividing said interior volume into a plurality of different individual compartments;

a plurality of discrete shapes of thermoplastic material which gradually dissolves in above ambient temperature oil, said thermoplastic material having oil properties improving additives which are released into the oil over time as said thermoplastic material dissolves; and said discrete shapes disposed within at least a plurality of said different individual compartments.

2. A canister as recited in claim 1 wherein said partitions comprise a metal grid, and wherein said discrete shapes are disposed in substantially all of said individual compartments.

3. A canister as recited in claim 2 wherein said container has first and second end faces which contain said inlet and said outlet, respectively.

4. A canister as recited in claim 3 wherein said container is substantially disc-shaped having a circumferential wall that is approximately 1/8–1/2 inch long, and so that the entire thickness of said container is between about 1/8–1/2 inch.

5. A canister as recited in claim 4 wherein said first end face has a flexible material seal surrounding said inlet.

6. A canister as recited in claim 4 wherein said first and second end faces are perforated so that said inlet and said outlet each comprise a plurality of perforation openings.

7. A canister as recited in claim 6 wherein said container further comprises a central opening larger than said perforation openings in each of said end walls in alignment with each other, and further comprising an interior wall extending between said central openings to provide a central oil flow passage distinct from oil flow through said perforation openings.

8. A canister as recited in claim 7 further comprising an O-ring surrounding each of said central openings.

9. A canister as recited in claim 8 in combination with an oil filter and engine block, said container disposed between said oil filter and engine block, and said engine block having an exteriorly threaded tube which extends through said central openings and engages said oil filter.

10. A canister as recited in claim 6 wherein said perforation openings overlap a plurality of said individual volumes, and said openings are dimensioned and positioned with respect to said grid and said discrete elements are shaped and dimensioned so that said discrete elements cannot pass through said perforation openings.

11. A canister as recited in claim 2 wherein said container comprises first and second parts, each having a perforated end wall and a circumferential wall, said first part circumferential wall having a larger diameter than said second part circumferential wall so that said circumferential walls are concentric; and further comprising a sealant for sealing said parts together.

12. A canister as recited in claim 1 wherein said discrete shapes include an antioxidant, acid neutralizer, anti-foaming agent, detergent, viscosity enhancer, or combinations thereof.

13. A canister as recited in claim 1 wherein said container comprises an elongated tube having first and second end faces, and a circumferential wall having a length of more than one inch in a dimension of elongation, said inlet in said first face and said outlet in said second face.

14. A canister as recited in claim 13 wherein said partitions comprise a plurality of disc-shaped elements each extending in a plane substantially transverse to said dimension of elongation, said elements having a plurality of openings therein shaped and dimensioned with respect to said discrete shapes so that said discrete shapes cannot pass through said openings in said elements.

15. A canister as recited in claim 14 wherein said individual volumes are less than filled with said discrete shapes so that oil flowing through said container will agitate and flow around said discrete shapes for optimum additive release.

16. A canister as recited in claim 14 further comprising a check valve connected to said outlet to preclude reverse flow of oil into said outlet.

17. A canister as recited in claim 14 wherein said inlet includes metering jet for limiting the flow rate through said container.

18. A canister as recited in claim 14 wherein said individual compartments include an end compartment adjacent said second face, said end compartment devoid of said discrete shapes.

19. A canister as recited in claim 14 further comprising a screen disposed at said outlet.

20. A canister as recited in claim 14 wherein said inlet is connected to an engine block, and said outlet is connected to an oil filter.

\* \* \* \* \*